Sept. 7, 1965     H. STOLLENWERK     3,204,998
AMBULANCE
Filed July 23, 1963     3 Sheets-Sheet 1
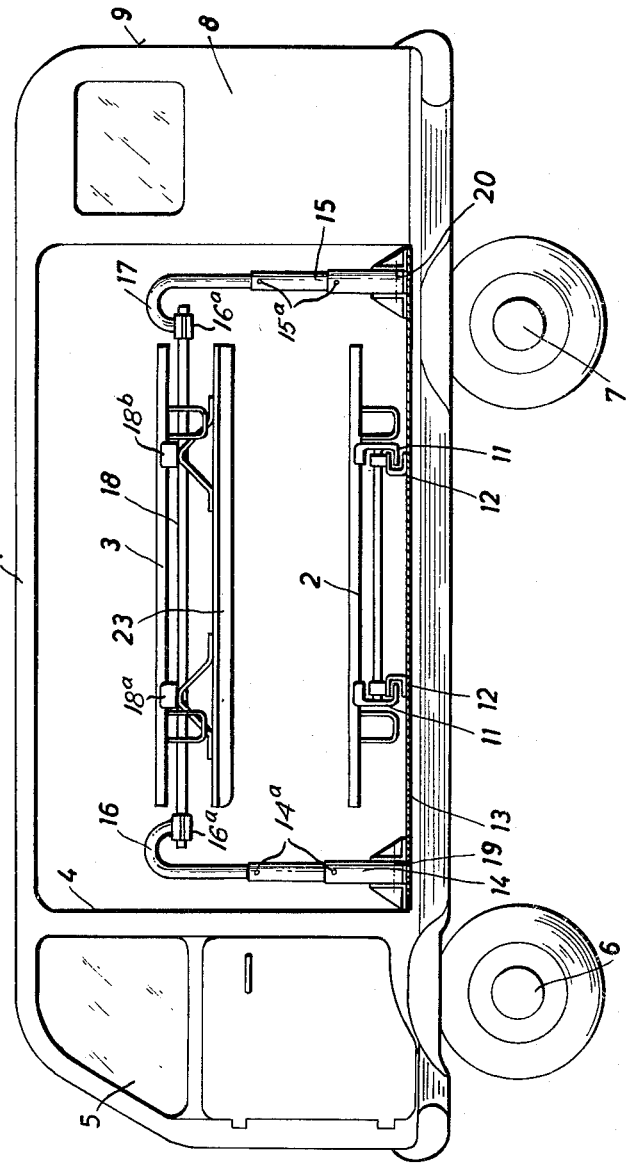
INVENTOR
Hans Stollenwerk
BY Lowry & Rinehart
ATTYS.

Sept. 7, 1965   H. STOLLENWERK   3,204,998
AMBULANCE
Filed July 23, 1963   3 Sheets-Sheet 2
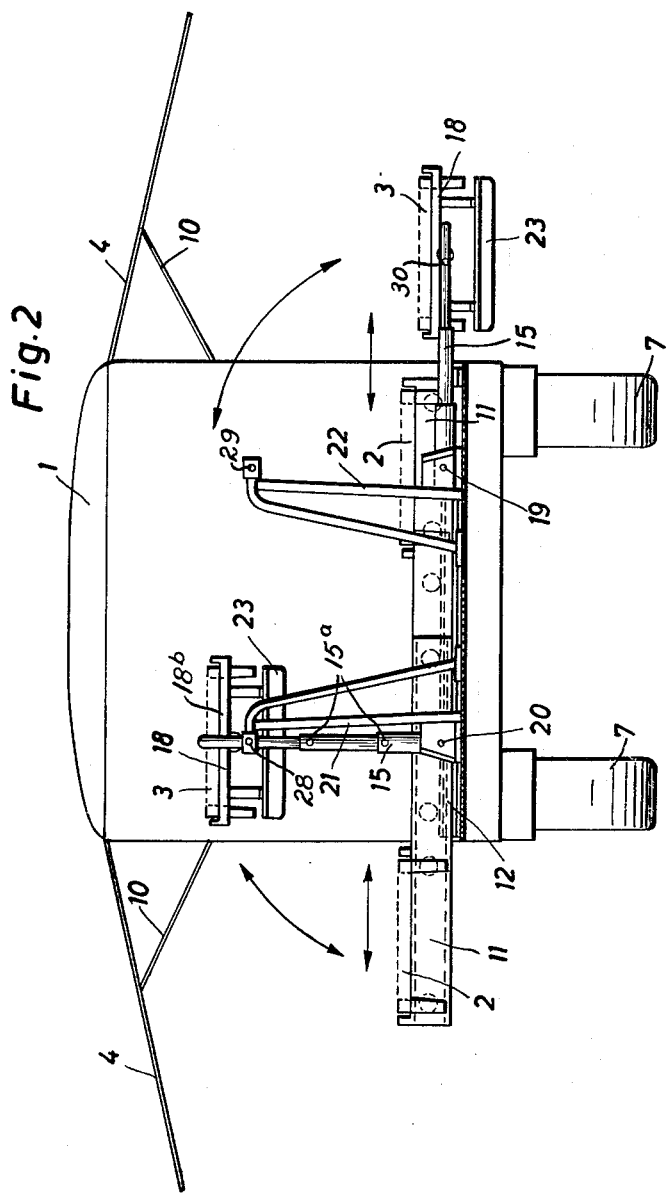
INVENTOR
Hans Stollenwerk
BY Lowry & Rinehart
ATTYS.

Sept. 7, 1965 H. STOLLENWERK 3,204,998
AMBULANCE
Filed July 23, 1963 3 Sheets-Sheet 3
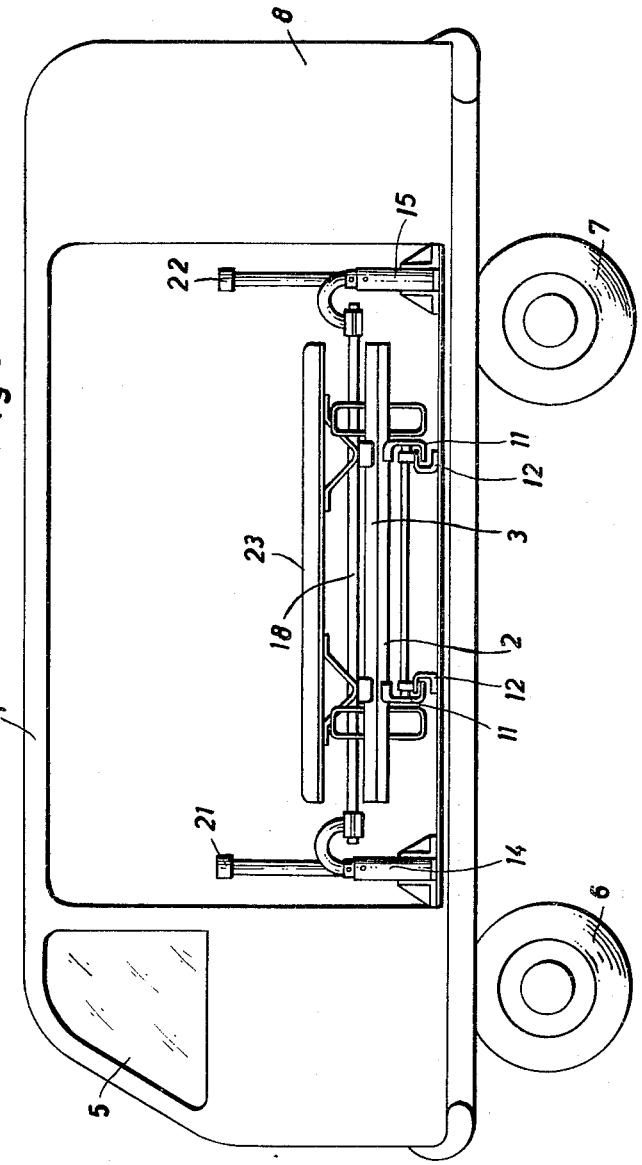
INVENTOR
Hans Stollenwerk
BY Lowry & Rinehart
ATTYS.

3,204,998
AMBULANCE
Hans Stollenwerk, 197 Dellbrucker Hauptstrasse, Cologne-Dellbruck, Germany
Filed July 23, 1963, Ser. No. 297,132
8 Claims. (Cl. 296—19)

The present invention relates to a vehicle or ambulance for transporting sick persons or invalids of the type in which the vehicle body is equipped for the introduction and support of a plurality of stretchers.

Vehicles for the transportation of sick persons are known in which a receiving bar linkage system or rail system is so arranged in the vehicle body that the stretchers can be introduced into the interior of the vehicle from the sides of the body to different levels therein through openings when lateral walls of the vehicle body are lifted upwardly. The floor of the vehicle body has rails which can be drawn out and on which the stretchers can be pushed in a lateral direction outwardly of the vehicle body. Furthermore, such vehicles are generally provided with a pivoting device for the upper stretchers consisting of four-bar linkages which, by reversing the four-bar linkages, the upper stretcher can be pivoted laterally and outwardly and displaced to the level of the lower stretcher, i.e. to a waist high position at which loading and unloading of stretchers is readily effected. The upper stretcher is articulated to the four-bar linkage and can be hinged upwardly if the lower stretcher is to be used as a seat. With this arrangement, the stretchers must be specially designed depending on whether they are to be used above or below. Since the upper stretcher is firmly articulated to the frame, it cannot be disassociated with the vehicle and introduced somewhere else. It is also impossible to interchange the two stretchers intended for use above and below.

According to the present invention, a vehicle is provided for transporting sick persons wherein the vehicle body is arranged for the introduction and support of a plurality of stretchers with supporting members being so arranged in the vehicle body that the stretchers can be inserted into the interior of the vehicle through openings in the sides of the body formed when lateral walls of the vehicle body are lifted upwardly. The vehicle further includes interengaging rails on the floor of the vehicle body which are adapted to be drawn out and which extend transversely of the longitudinal axis of the vehicle for receiving stretchers to be located in the lower portion of the vehicle. At least two telescopically vertically adjustable supporting columns which are bent over in the manner of a hook at their upper ends are also provided for retaining stretchers in an upper portion of the vehicle, the lower ends of the support columns being mounted for outward pivotal movement transversely of the longitudinal axis of the vehicle.

With this construction of the vehicle, the stretchers and any supports or rests which may be provided can be interchanged as desired and this interchange is possible both between upper and lower elements and between right hand and left hand elements. Furthermore, the stretchers can be used as desired outside the vehicle. The stretchers can also be used to form a bench without it being necessary to equip the stretcher itself with hinged legs or the like. With the telescopic columns in the retracted state the bench is formed by the two receiving members and an upholstered part. When the support columns are extended the upholstered sitting surface can be so suspended from the upper spar that the upholstered surface faces the person reclining on the lower stretcher, with the result that the latter has a pleasant view. A further advantage of the telescopically adjustable support columns resides in the fact that the patient can be so disposed that he is inclined in the longitudinal direction by adjusting the columns at different heights. This applies not only to the upper stretcher but also to the case in which only one lower stretcher is in use on one of the sides of the vehicle.

The stretcher-receiving part is connected with the support columns by means of a swivel joint and the swivel joint can be locked when the stretcher-receiving part or support is in a horizontal position.

For a better understanding of the invention and to show how the same may be carried into effect, reference will now be made, by way of example to the accompanying drawings, in which:

FIG. 1 is a side elevational view, partly in section, of one embodiment, showing a vehicle constructed in accordance with the present invention;

FIG. 2 is a rear end elevation showing the vehicle and the stretcher-receiving device; and FIG. 3 is a view similar to FIG. 1, showing the equipment in an alternative position.

A vehicle 1 for the transportation of sick persons or invalids is so constructed that stretchers 2 and 3 can be introduced into the interior of the vehicle from the sides of the vehicle body. For this purpose, lateral walls 4 that extend from the driver's cabin 5 beyond the length of a receiving device for the stretchers are constructed to be pivotally swung upwardly at their upper edges as shown in FIG. 2. The lateral walls 4 which are hinged to the vehicle body at their upper edges can be made in one piece. It is, however, also possible to subdivide each lateral wall 4 into a plurality of sections, each being adapted to be raised. The distribution of the stretchers is effected in such a manner that they are disposed substantially between front and rear axles 6, 7. In the rear portion of the vehicle body is provided a compartment 8 for an attendant or for a doctor. The compartment 8 is accessible through a rear wall 9 of the vehicle body by means of doors of a conventional construction (not shown). The lateral walls 4 can be held up in any suitable manner such as by supports or struts 10 (FIG. 2).

Telescopic rails 11 and 12 are arranged in the interior of the vehicle in a direction transverse to the longitudinal axis of the vehicle for receiving the lower stretcher 2. The rails 12 are secured to the vehicle floor 13 while the rails 11 can be pushed out telescopically to the side to such an extent that the stretcher projects completely externally of the vehicle body. This arrangement facilitates the introduction and placing in position of the stretcher and furthermore it provides ready access to the patient from the side.

For supporting the upper stretcher 3 there are columns 14 and 15 formed of vertically telescopic sections. There is one column at each of the ends of the upper stretcher 3. The columns are bent over at the top, as at 16 and 17, so that their end surfaces face downward. Suspended between the columns 14 and 15 is a receiving or supporting member 18 on which the stretcher 3 can be placed. This receiving member has a central longitudinal spar on which are arranged at least two transverse spars 18a, 18b upon which the stretcher 3 rests. The suspension of the central spar of the receiving member 18 from the columns 14 and 15 is advantageously effected by means of swivel joints 16a, 16b.

Each column is pivotally mounted at its lower end about a pivot 19, 20, so that the columns can be swung into the horizontal position as shown on the right-hand side of FIG. 2. The swivel joint between the central spar of the receiving member 18 and the column ends 16, 17 ensures that, when the columns are moved into the horizontal position, the receiving member 18 still remains in the horizontal position. The receiving members 18 and the stretcher 3 disposed thereon are each prevented from being tilted out of the horizontal position thereof by suitable securing devices such as a pin 28 passed through an opening 29 in each of the retaining frames 21, 22 and received in an associated opening 30 in the columns 16, 17. The outward pivoting of the upper stretcher 3 into the lower horizontal position within the periphery of the vehicle makes easy positioning of the stretcher on the receiving member 18 possible. The pushing or pulling up or pushing or pulling over of the columns can be effected by means of winches driven from the vehicle engine. The columns 14, 15 can be adjusted at different heights, for example by means of a push-in connecting means 14a, 15a in the form of pins received in aligned openings in the columns 14, 15, so that the patient can be disposed in a suitable longitudinally inclined position.

A bench 23 is made fast with the receiving member 18. The said bench 23 hangs down when the receiving member 18 is in the position for receiving the upper stretcher 3. The face of the bench 23 faces the patient on the lower stretcher 2, this being more pleasant for the patient than if he were compelled to look at the frame faces of the receiving member 18 of the stretcher 3.

FIG. 3 shows the arrangement of the ambulance equipment if it is required to convey only seated persons. In this case, the columns 14 and 15 are telescoped downwardly. The receiving member 18 with the bench 23 has been pivoted through 180° about the longitudinal axis. The stretchers 2 and 3 bear directly on their abutment surfaces. The entire assembly is at a height such that the bench 23 is at the correct height for sitting purposes. With this arrangement, all the necessary parts of the vehicle interior are accommodated at points where they do not constitute a hindrance.

Due to the formation and design according to the invention of the receiving devices for the stretchers, any stretcher widths (these widths vary within specific limits) can be utilized in the above-described ambulances. The same applies also to stretchers of different lengths. In this manner, the ambulance according to the invention can be universally used for receiving stretchers of different dimensions. The main significance of the construction of the ambulance and of the receiving device resides, however, in the fact that the stretchers can, independently of whether they are to be positioned above or below, be laid down on the frame parts at "working" height i.e. at waist height outside the vehicle and furthermore the patients disposed on the stretchers can be displaced or pivoted out to this working height externally of the vehicle body. All displaceable or pivotal parts can additionally be provided with safety ensuring securing devices or other locking devices, in order that the position of the parts may be reliably and safely retained during the travel of the vehicle.

What is claimed is:

1. An ambulance comprising a vehicle body, side walls hinged at their upper ends to the body and adapted to be swung outwardly and upwardly to provide unobstructed side openings for entrance and exit of persons, upper and lower stretcher supports arranged in superposed relation in the body, said lower stretcher supports including telescopic rails carried by the bottom of the vehicle, said rails extending transversely of the vehicle body whereby the lower stretcher supports may be shifted transversely of the vehicle body to present the lower supports exteriorly of the body through the side openings for selective placement and removal of a stretcher on the lower supports and at least two vertical telescopic columns in the body connected to the upper stretcher supports for the support of the upper stretcher supports, and said columns being pivotally mounted at their lower ends to said body and to the upper ends of said upper stretcher supports for swinging movement through a side opening of the body for the placement and removal of a stretcher thereon.

2. An ambulance as in claim 1, wherein locking means is provided between the columns and upper stretcher supports for holding the latter against movements when the upper stretcher supports are horizontally positioned.

3. An ambulance comprising a vehicle body, side walls hinged at their upper ends to the body and adapted to be swung outwardly and upwardly to provide unobstructed side openings for entrance and exit of persons, upper and lower stretcher supports arranged in superposed relation in the body, said lower stretcher supports including telescopic rails carried by the bottom of the vehicle, said rails extending transversely of the vehicle body whereby the lower stretcher supports may be shifted transversely of the vehicle body to present the lower supports exteriorly of the body through the side openings for selective placement and removal of a stretcher on the lower supports and at least two vertical telescopic columns in the body connected to the upper stretcher supports for the support of the upper stretcher supports, and said columns being pivotally mounted at their lower ends to said body and to the upper ends of said upper stretcher supports for swinging movement through a side opening of the body for the placement and removal of a stretcher thereon, a downwardly directed arcuate extension at the upper end of each of the columns, and an elongated bench secured to the underside of the upper stretcher supports and adapted when the telescopic columns are collapsed and the upper stretcher support is reversed to provide an elongated seat bench in proximity of the lower stretcher support.

4. An ambulance as in claim 1, wherein locking means is provided between the columns and upper stretcher supports for holding the latter against movements when the upper stretcher supports are horizontally positioned, a downwardly directed arcuate extension at the upper end of the column, and an elongated bench secured to the underside of the upper stretcher supports and adapted when the telescopic columns are collapsed and the upper stretcher frame is reversed to provide an elongated seat bench in proximity of the lower stretcher support.

5. The ambulance as in claim 1, wherein the transversely extending rails are arranged in pairs adjacent and between the two telescopic columns.

6. The ambulance as in claim 1 wherein each of the telescopic columns includes upper and lower telescopic portions, and retaining means between said bottom and the upper telescopic portion of at least one of said columns for retaining said columns in a generally vertical plane.

7. The ambulance as in claim 1 wherein said upper stretcher supports are secured to said telescopic columns by swivel joints, and means for preventing movement of said swivel joints when said upper stretcher supports are disposed in a generally horizontal plane.

8. The ambulance as in claim 1 wherein a bench is attached to the underside of the upper stretcher supports.

References Cited by the Examiner

UNITED STATES PATENTS

| 1,225,015 | 5/17 | Crossley | 296—19 |
| 1,275,733 | 8/18 | Pezzetti | 296—19 |
| 2,456,024 | 12/48 | Schofield | 296—19 |

FOREIGN PATENTS

| 108,191 | 7/17 | Great Britain. |
| 484,510 | 7/17 | France. |

A. HARRY LEVY, *Primary Examiner.*